United States Patent
Castonguay et al.

(10) Patent No.: US 12,218,943 B2
(45) Date of Patent: *Feb. 4, 2025

(54) LOGIN AND AUTHENTICATION METHODS AND SYSTEMS

(71) Applicant: Wells Fargo Bank, N.A., San Francisco, CA (US)

(72) Inventors: Mark David Castonguay, San Francisco, CA (US); Upul D. Hanwella, San Francisco, CA (US); Bryan Hall, Charlotte, NC (US); Nicola A. Maiorana, Charlotte, NC (US); David Lerner, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,956

(22) Filed: Nov. 27, 2023

(65) Prior Publication Data

US 2024/0098092 A1 Mar. 21, 2024

Related U.S. Application Data

(63) Continuation of application No. 18/079,211, filed on Dec. 12, 2022, now Pat. No. 11,831,648, which is a
(Continued)

(51) Int. Cl.
*H04L 9/40* (2022.01)
*G06F 21/31* (2013.01)

(52) U.S. Cl.
CPC ............ *H04L 63/102* (2013.01); *G06F 21/31* (2013.01); *H04L 63/083* (2013.01);
(Continued)

(58) Field of Classification Search
CPC ............ G06F 21/31; G06F 2221/2103; G06F 2221/2133; H04L 63/102; H04L 63/083; H04L 63/0853; H04L 2463/082
See application file for complete search history.

(56) References Cited

U.S. PATENT DOCUMENTS

| 9,275,215 | B2 | 3/2016 | Bailey |
| 9,300,683 | B2 | 3/2016 | Rapaport et al. |

(Continued)

*Primary Examiner* — Thaddeus J Plecha
(74) *Attorney, Agent, or Firm* — Foley & Lardner LLP (57) ABSTRACT

Systems, methods, and apparatuses for authenticating requests to access one or more accounts over a network using authenticity evaluations of two or more automated decision engines are discussed. A login request for access to a user account may be submitted to multiple decision engines that each apply different rulesets for authenticating the login request, and output an evaluation of the authenticity of the login request. Based on evaluations from multiple automated decision engines, the login request may be allowed to proceed to validation of user identity and, if user identity is validated, access to the user account may be authorized. Based on the evaluations, the login attempt may also be rejected. One or more additional challenge question may be returned to the computing device used to request account access, and the login request allowed to proceed to validation of identity if the response to the challenge question is deemed acceptable.

20 Claims, 5 Drawing Sheets

Related U.S. Application Data continuation of application No. 17/197,865, filed on Mar. 10, 2021, now Pat. No. 11,528,277, which is a continuation of application No. 16/207,807, filed on Dec. 3, 2018, now Pat. No. 10,965,683.

(60) Provisional application No. 62/595,969, filed on Dec. 7, 2017.

(52) U.S. Cl.
CPC .. *H04L 63/0853* (2013.01); *G06F 2221/2103* (2013.01); *G06F 2221/2133* (2013.01); *H04L 2463/082* (2013.01); *H04L 2463/144* (2013.01)

(56) References Cited

U.S. PATENT DOCUMENTS

| | | | |
|---|---|---|---|
| 9,348,981 B1 * | 5/2016 | Hearn | H04L 9/3271 |
| 9,378,354 B2 | 6/2016 | Bailey | |
| 9,633,190 B2 | 4/2017 | Bailey | |
| 9,648,034 B2 | 5/2017 | Bailey et al. | |
| 9,680,868 B2 | 6/2017 | Bailey et al. | |
| 9,749,356 B2 | 8/2017 | Bailey et al. | |
| 9,749,357 B2 | 8/2017 | Bailey et al. | |
| 9,749,358 B2 | 8/2017 | Bailey et al. | |
| 9,800,601 B2 | 10/2017 | Bailey et al. | |
| 9,807,104 B1 * | 10/2017 | Sarra | H04L 63/102 |
| 9,813,402 B1 | 11/2017 | Chen et al. | |
| 9,985,943 B1 | 5/2018 | Reading et al. | |
| 10,587,636 B1 | 3/2020 | Aziz et al. | |
| 10,965,683 B1 * | 3/2021 | Castonguay | H04L 63/0853 |
| 11,528,277 B1 * | 12/2022 | Castonguay | G06F 21/40 |
| 11,831,648 B1 * | 11/2023 | Castonguay | G06F 21/31 |
| 2013/0042306 A1 | 2/2013 | Hou et al. | |
| 2015/0161384 A1 | 6/2015 | Gu et al. | |
| 2016/0253486 A1 | 9/2016 | Sarkar et al. | |
| 2017/0070534 A1 | 3/2017 | Bailey et al. | |
| 2018/0129797 A1 | 5/2018 | Rush et al. | |
| 2021/0056192 A1 | 2/2021 | Haq et al. | |

* cited by examiner

LOGIN AND AUTHENTICATION METHODS AND SYSTEMS

CROSS REFERENCE TO RELATED APPLICATIONS

This application is a continuation of U.S. patent application Ser. No. 18/079,211 filed Dec. 12, 2022, which is a continuation of U.S. patent application Ser. No. 17/197,865 filed Mar. 10, 2021, which is a continuation of U.S. patent application Ser. No. 16/207,807 filed Dec. 3, 2018, which claims priority to U.S. Provisional Patent Application No. 62/595,969 entitled "Login And Authentication Methods And Systems," filed Dec. 7, 2017, each of which is incorporated herein by reference in its entirety.

TECHNICAL FIELD

Embodiments of the present disclosure relate generally to systems and methods for fraud prevention and user authentication, and more specifically, to enhanced login approaches that improve account validation by consolidating multiple strategies.

BACKGROUND

When a person wishes to access an account administered by an organization (such as a bank account held at a financial institution), the person may utilize an access portal via an internet browser or other application (such as a mobile application provided by the organization). Commonly, an authorization process involves obtaining a username and password to help verify the identity of the owner of the account. The username and password are typically selected by the account owner, and are not normally known to others (unless the account owner reveals the username and password with others). If the username and password are not known to others (i.e., to unauthorized users), then they can be very useful in verifying that a user seeking access to an account is either the account owner or a user authorized by the account owner to access the account.

Data breaches and hacks have made account records (which may include usernames and/or passwords) available to unauthorized users at an unprecedented rate. It has been reported that, in the first nine months of 2017, the number of records exposed as a result of data breaches is more than 300% higher than in the same period of 2016. Sometimes, an authorized user may acquire a set of usernames and passwords (via, for example, the dark web) without knowing the identity of the institutions at which the corresponding accounts are held. Manually entering the leaked username and password combination at dozens, hundreds, or thousands of portals to find which portal(s) provide access to user accounts using the leaked combinations would be very tedious and time-consuming. And, the more time it takes to find a match, the more likely that a username and password will be changed and become unusable. To expedite the process, unauthorized users sometimes use software robots ("bots"), also known as internet bots and web robots, to automate the process. Such bots are software applications that run scripts to automate tasks over the internet, and are well suited to performing simple and repetitive tasks faster than possible for a human alone. By submitting known username and password combinations to a large number of account portals, bots can (more quickly) help determine which accounts are accessible using the known username and password combinations.

Because these bots are not expected to be legitimately used by account owners to access their accounts, restricting access to bots can be an effective security measure for preventing fraud. However, bots may behave like human users, and conventional security measures intended to prevent account access to bots are thus not faultless. A security measure may assess the risk that an attempt to access an account is being perpetrated by a bot rather than a human, and if the risk is unacceptably high, the measure may deny account access. But, false positives (i.e., determining that a login attempt is likely a bot or is otherwise illegitimate when it is legitimate) and false negatives (i.e., determining that a login attempt is likely not a bot or is otherwise legitimate when it is illegitimate) can be common. Such false positives and false negatives at best inconvenience legitimate users, and at worst, allow illegitimate data breaches and fraudulent activity to escape security measures.

What is needed is an approach that enhances risk assessments and reduces the likelihood that illegitimate logins and attempts to misappropriate username and password combinations will escape security measures.

SUMMARY

Various example embodiments relate to systems, methods, and apparatuses for authenticating requests to access one or more accounts over a network using authenticity evaluations of two or more automated decision engines. One such embodiment involves a method that includes accepting, from a remote computing device, a login request for access to a user account. The login request may have been submitted through a networked account portal that was presented to the remote computing device via a web browser or a mobile device application. The login request may be submitted to a first automated decision engine configured to apply a first ruleset for authenticating the login request and output a first determination of the authenticity of the login request based on application of the first ruleset. The login request and/or the first determination may also be submitted to a second automated decision engine configured to apply a second ruleset for authenticating the login request and output a second determination of the authenticity of the login request based on the application of the second ruleset, where the second ruleset differs from the first ruleset. Based on the first and second determinations from the first and second automated decision engines, respectively, the method may involve performing at least one of the following acts: i) allowing the login request to proceed to validation of user identity and, if user identity is validated, authorizing access to the user account; ii) blocking the login request from proceeding to validation of user identity; and/or iii) returning a challenge query to the web browser or the mobile device application.

In various configurations, the first and second automated decision engines, in authenticating the login request, are adapted to evaluate whether the login request was submitted by a human user or a software robot. Validation of user identity may include validating one or both of a username and a password of an owner of the user account. Returning the challenge query to the web browser or the mobile device application may comprises returning a challenge question to the web browser or the mobile device application, receiving, via the web browser or mobile device application, a response to the challenge question, and providing the response to one or both of the first and second automated decision engines. The challenge question may be a second challenge question submitted via the web browser or the mobile device application, where one or both of the first and second automated decision engines is configured to submit a first challenge question in authenticating the login request. By using the first and second determinations from the first and second automated decision engines, respectively, the method may help reduce false positives and/or false negatives in evaluating whether login requests are submitted by human users or software robots.

In different versions, allowing, blocking, or returning a challenge query based on the first and second determinations includes submitting both the first and second determinations to an automated central orchestration engine configured to apply, to the first and second determinations, a third ruleset for authenticating the login request, where the third ruleset differs from the first and second rulesets. The automated central orchestration engine may be configured not to apply the third ruleset to the login request in authenticating the login request, but rather to the determinations of automated decision engines. For example, the step of allowing, blocking, or returning a challenge question may be based only on the first and second determinations from the first and second automated decision engines, respectively. The login request may include, in various versions, at least one of: data identifying an owner of the user account to be accessed; and data corresponding to the remote computing device executing the web browser or the mobile device application and/or to the network connection. The login request may be provided by a submitter, where the login request includes data corresponding to a behavior of the submitter of the login request. If the login request is blocked from proceeding to validation of user identity, the method may further include returning a standardized error message to the web browser or the mobile device application, wherein the standardized error message does not indicate a result of the evaluation corresponding to whether the login request was submitted by a human user or a software robot.

Embodiments of the present disclosure provide for a logging system that is capable of coordinating multiple risk evaluations to enhance accuracy. These and other features and benefits, together with the organization and manner of operation thereof, will become apparent from the following detailed description when taken in conjunction with the accompanying drawings.

DETAILED DESCRIPTION

The present disclosure relates to systems, methods, and apparatuses for enhanced login and account/identity validation. In example embodiments, a principal control point serves as an automated central orchestration engine ("central orchestrator") of pre-authentication protections to consolidate and respond to different pre-authentication risk evaluations. A login and authorization system may employ several strategies for protecting against fraudulent or unauthorized access to user accounts, but each strategy may have different strengths and weaknesses, and no one strategy is typically able to achieve 100 percent accuracy. For example, a system may utilize multiple automated decision engines, each applying a unique set of criteria in evaluating security risks. Because different criteria may be better suited to detecting fraudulent activity in different situations (e.g., for particular types of attacks), some illegitimate activity may be missed by one automated decision engine but caught by another automated decision engine. The central orchestrator takes into account risk evaluations from two or more different automated decision engines to make a more informed decision regarding whether, for example, a login attempt is legitimate. The central orchestrator is thus able to leverage the risk evaluations of multiple strategies to enhance accuracy, reducing false positives and false negatives in account validation.

Figure 1:
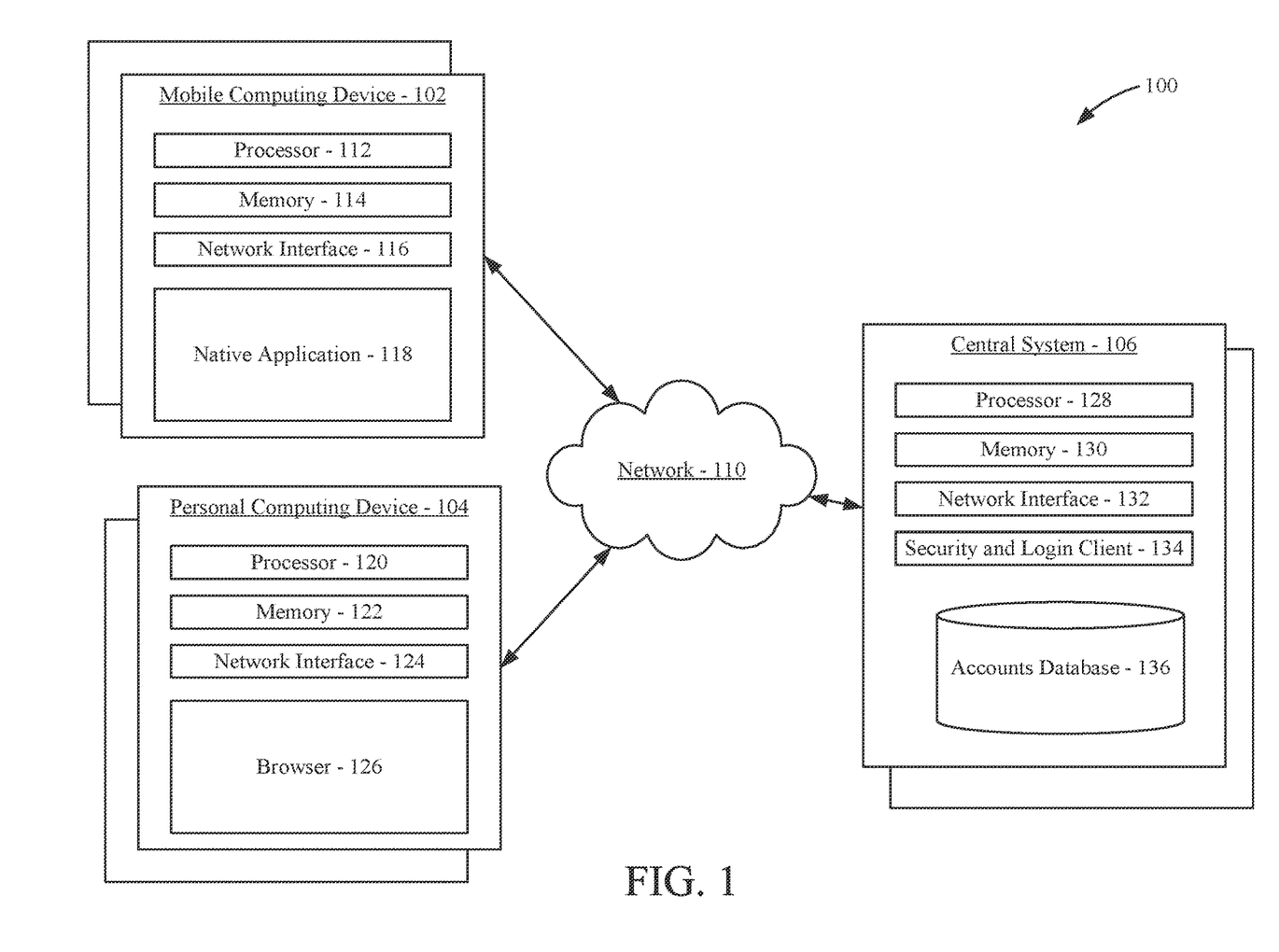
FIG. 1 is a diagram of an example computing system according to one or more embodiments.

Referring to FIG. 1, a block diagram of a computing system 100 is shown according to one or more example embodiments. As described herein, the computing system 100 enables enhanced login and account validation. The computing system 100 includes a plurality of computing devices 102, 104 able to access a central system 106 via a network 110. The central system 106 provides a networked access portal to allow users to log into and access accounts. The computing device 102 may be, for example, a mobile computing device (such as a smartphone, tablet, laptop, etc.), and computing device 104 may be, for example, a personal computing device (such as a desktop computer or workstation). The components of the computing system 100 are communicably and operatively coupled to each other over the network 110. The network 110 may be any type of type of network. For example, the network 110 may include a wireless network interface (e.g., 802.11X, ZigBee, Bluetooth, Internet, etc.), a wired network interface (e.g., Ethernet, USB, Thunderbolt, etc.), or any combination thereof. The network 110 is structured to permit the exchange of data, values, instructions, messages, and the like between computing devices 102, 104 and the central system 106.

Each mobile computing device 102 includes a processor 112, a memory 114, and a network interface 116. The processor 112 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the mobile computing device 102. The memory 114 (e.g., RAM, ROM, NVRAM, Flash Memory, hard disk storage, etc.) may store data and/or computer code for facilitating at least some of the various processes described herein. In this regard, the memory 114 may store programming logic that, when executed by the processor 112, controls the operation of the mobile computing device 102. The network interface 116 may be structured to allow the mobile computing device 102 to communicate data to and from other devices (such as central system 106) either directly or via the network 110. The mobile computing device 102 includes a native application 118 (such as an application provided or authorized by the institution implementing central system 106) to allow users to communicate with central system 106 during a user account login sequence.

Still referring to FIG. 1, each personal computing device 104 includes a processor 120, a memory 122, and a network interface 124. The processor 120 may be implemented as a general-purpose processor, an ASIC, one or more FPGAs, a DSP, a group of processing components, or other suitable electronic processing components structured to control the operation of the personal computing device 104. The memory 122 (e.g., RAM, ROM, NVRAM, Flash Memory, hard disk storage, etc.) may store data and/or computer code for facilitating at least some of the various processes described herein. In this regard, the memory 122 may store programming logic that, when executed by the processor 120, controls the operation of the personal computing device 104. The network interface 124 is structured to allow the personal computing device 104 to communicate data to and from other devices (such as central system 106) either directly or via the network 110. The personal computing device 104 includes a browser 126 (such as Google Chrome, Microsoft Edge, Internet Explorer, etc.) to allow users to communicate with central system 106 during a user account login sequence.

The central system 106 includes a processor 128, memory 130, and a network interface 132. The processor 128 may be implemented as a general-purpose processor, an ASIC, one or more FPGAs, a DSP, a group of processing components, or other suitable electronic processing components structured to control the operation of the central system 106. The memory 130 (e.g., RAM, ROM, NVRAM, Flash Memory, hard disk storage, etc.) may store data and/or computer code for facilitating at least some of the various processes described herein. In this regard, the memory 130 may store programming logic that, when executed by the processor 128, controls the operation of the central system 106. The network interface 132 is structured to allow the central system 106 to communicate data to and from other devices (e.g., mobile device 102, personal computing device 104, etc.) either directly or via the network 110. The computing system 100 may be arranged such that the central system 106 operates as a server, and computing devices 102, 104 operate as clients.

The central system may include a security and login client 134 which, as further discussed below, may provide fraud prevention measures and security protections (such as a digital perimeter, pre-authentication security measures, identify verification protocols, etc.). In some arrangements, a central system 106 includes an account database 134 for storing information on users and user accounts (such as bank accounts) to be accessed via computing devices 102, 104. In certain versions, some or all of the account information may be stored on separate local or remote computing devices that are accessible to, or via, the central system 106. For example, if the central system 106 is administered by (or on behalf of) a financial institution, the accounts database 136 may include customer account information. As another example, if the central system 106 is administered by (or on behalf of) a government entity (e.g., a department of motor vehicles, a state department, a tax department, etc.), the accounts database 136 may include information on government-issued documents (e.g., driver's licenses, passports, tax form filings, permits, etc.).

It is noted that the central system 106 may be employed to provide users with convenient access to sensitive or otherwise private information. Because of the nature of the information, such systems can be attractive targets for fraudulent activity, and security measures are normally employed to help prevent unauthorized account access. On the one hand, if security measures are not adequately stringent, user information may be at risk of being breached. On the other hand, if security measures are too stringent (or otherwise not adequately discerning), legitimate users may be denied access to their accounts, defeating the purpose of a computing system arranged to allow for convenient remote account access. A set of security measures may be adapted, for example, to assessing the risk that a login attempt was instigated by a bot, and if the risk is too high, denying access to the suspected bot. False positives—that is, determining that an attempt is illegitimate (e.g., a bot) when it is legitimate (e.g., a human user)—are undesirable because a user is (at the very least) inconvenienced if denied access to his or her account. False negatives—that is, determining that an attempt is legitimate (e.g., a human user) when it is illegitimate (e.g., a bot)—are also undesirable because sensitive data may fall into the wrong hands. Because of the number of users that may seek to access their accounts through such a portal on a daily basis, even a small fraction of one percent improvement (i.e., even a seemingly miniscule reduction in false positives and false negatives) can impact many thousands of users (and their families) each day, and each failed legitimate access attempt and successful illegitimate access attempt can be very costly to users monetarily and in terms of time and energy.

Figure 2:
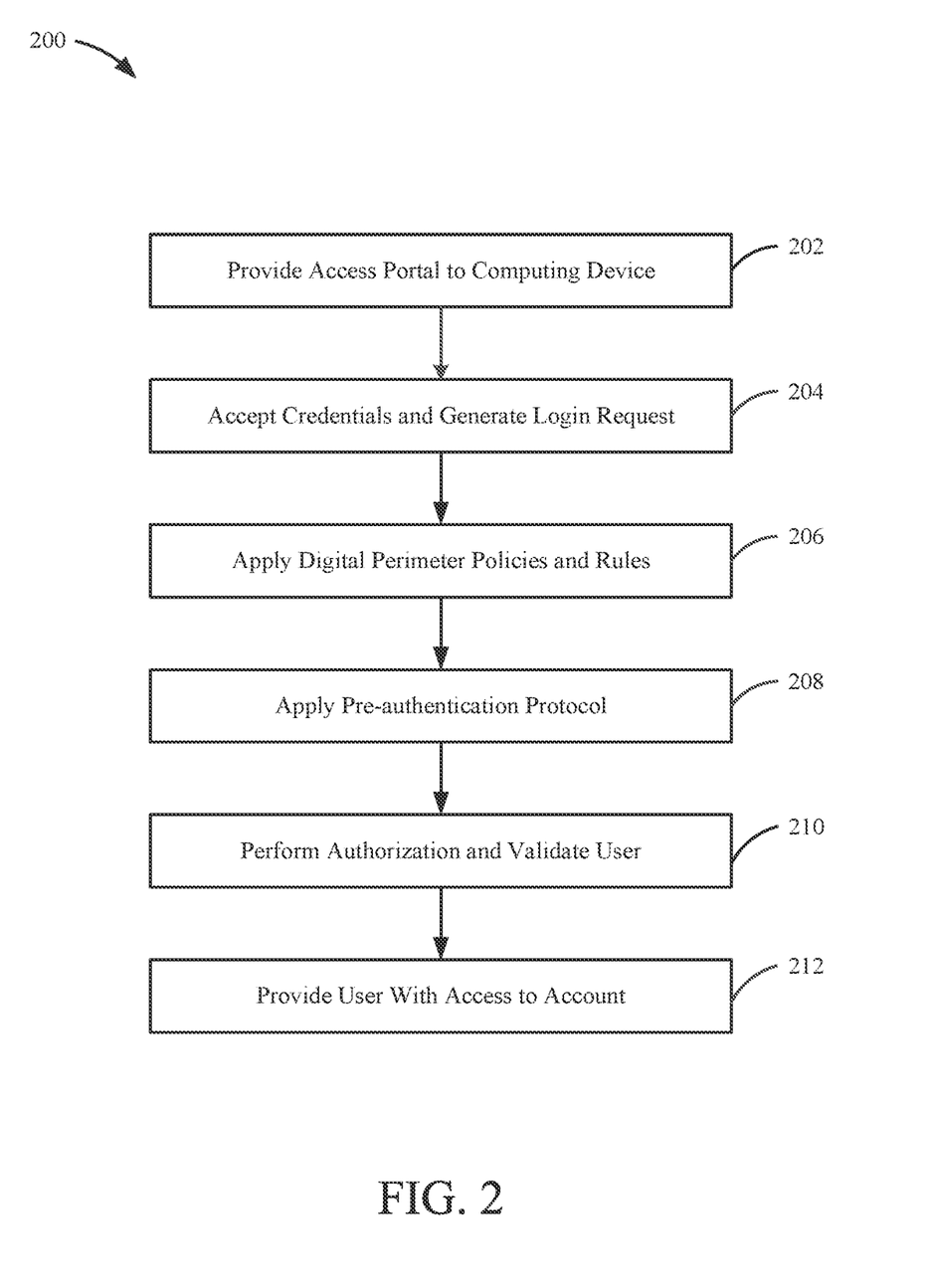
FIG. 2 is a flow diagram of an example logging and authentication method according to one or more embodiments.

Referring to FIG. 2, a flow diagram of an example method 200 for enhanced login and authentication for access to user accounts is described according to various embodiments. The method 200 may be performed by a central system 106. Generally, at 202, the central system 106 provides an access portal through which users are able to request access to user accounts. At 204, the central system 106 may accept login credentials (such as a username and password) as part of the process of verifying a login attempt. A login request may include the credentials and, optionally, additional data (which may be collected by central system 106) related to the login attempt, such as the hardware and software environment of the device (e.g., mobile and personal computing devices 102, 104) as well as network-related information, such as the device's Internet Protocol (IP) address. The login request may also include data related to the behavior of the user and the user's device (and deviations from normal behavior), which may suggest or indicate that a login attempt is illegitimate. Example types of behavior that may be considered may include time taken during the login process (e.g., time taken to enter in credentials or responses to such queries as challenge questions), deviations in applications or computing devices used to login, time of day, number of incorrect responses entered, etc.

In addition to an enterprise perimeter (such as institution-wide firewalls), at 206, the central system 106 may apply a digital perimeter to evaluate the legitimacy of a login attempt, followed by a pre-authentication protocol at 208. As will be further discussed below, the digital perimeter and/or other security strategies employed as part of pre-authentication protocols may be considered decision engines that evaluate the legitimacy of login attempts. If pre-authentication is successfully passed, at 210, the login process may proceed with user authorization and validation. If the login attempt is successful, at 212 a user may be provided access to an account.

Figure 3:
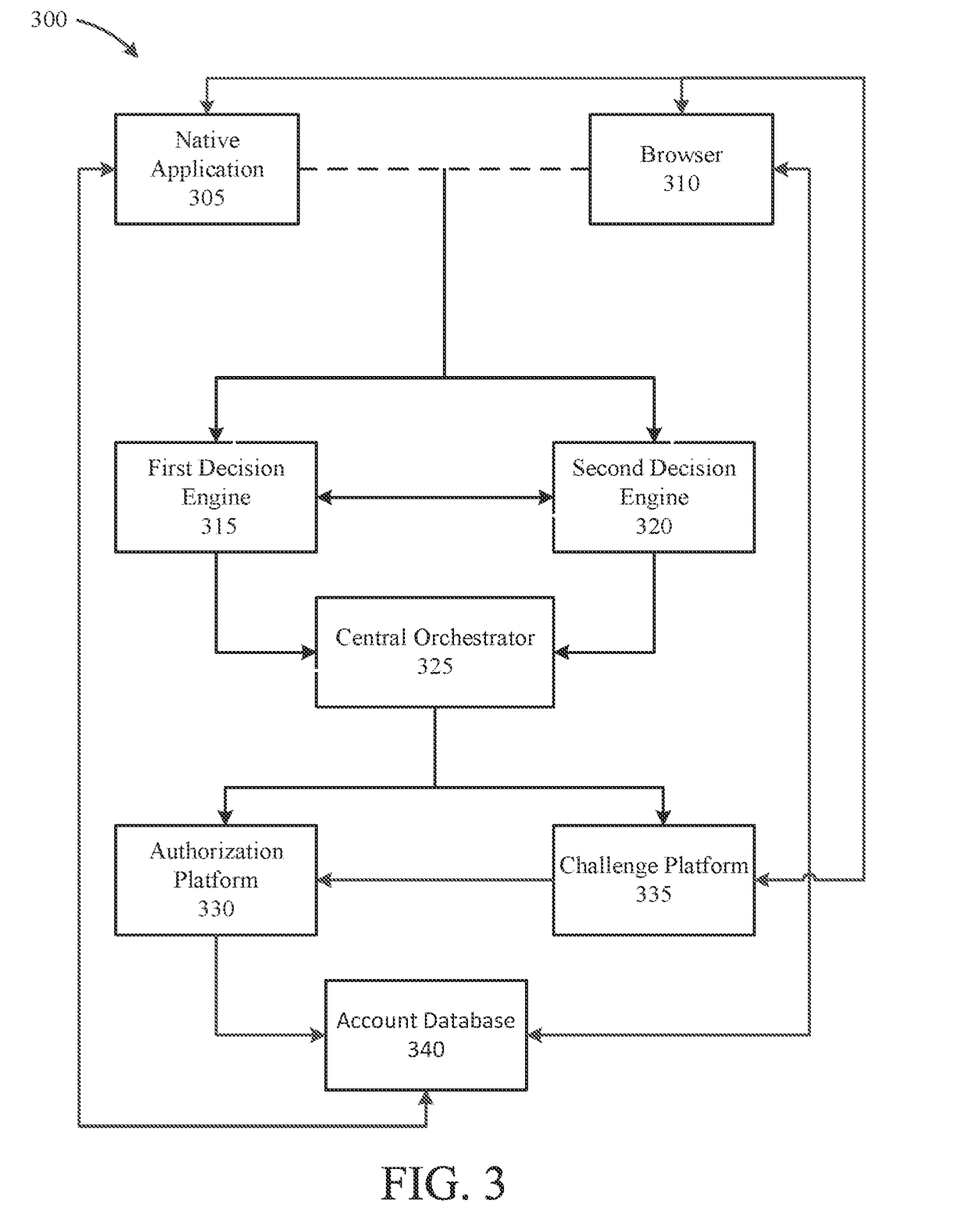
FIG. 3 is an example data flow diagram according to one or more embodiments.

Referring to the example data flowchart 300 in FIG. 3, in one or more embodiments, an application 305 (such as a native application running on, e.g., mobile computing device 102) or browser 310 (running on, e.g., either mobile computing device 102 or personal computing device 104) may provide data (such as login credentials and responses to initial challenge questions) to first decision engine 315 and second decision engine 320. First and second decision engines 315, 320, which may evaluate risks using the data in a login request, may be part of the digital perimeter and/or part of pre-authentication, as further discussed below. The first and second decision engines 315, 320 may apply different rules and policies to the login request in generating risk assessments, which may be shared with each other and/or with a central orchestrator 325, which is adapted to applying its own ruleset (examples of which are further discussed below) to determine whether a login attempt should be blocked, allowed, or challenged. If a login attempt passes protection measures, the central orchestrator 325 may allow the login request to proceed (to be promoted) to an authorization platform 330 that is adapted to validating a user's identify.

Alternatively, as further discussed below, the central orchestrator 325 may determine that a query (e.g., a challenge question) should be returned to the user (which may be a human user or a software bot impersonating a user) via native application 305 or browser 310. The query may be specific, such as a challenge question related to the user's identity, preferences, history, etc.) or the query may be generic (i.e., not specific to the user), such as a question accompanying an image, requiring the user to identify or otherwise answer a question describing or otherwise related to the image. Such challenge questions are generally easier for a human, and especially for a human account owner or authorized user of an account, and are intended to help verify that a login attempt is legitimate. In certain configurations, responses to challenge questions may be provided to first and second decision engines 315, 320 for evaluation. Alternatively or additionally, response questions may be routed directly back to the challenge platform 335 in certain configurations. If a user "passes" the challenge question (i.e., provides an acceptable response), the login attempt may proceed to the authorization platform 330 for validation. If the login attempt is validated by authorization platform 330, account information stored in account database 340 may be exchanged with the user, allowing users to access account information and to update information in the account database 340.

Referring to the example embodiments represented in FIG. 4, in system 400, native application 402 or Internet browser 403 may be used to initiate a login request that is first received by the digital perimeter 404, followed by a pre-authentication protocol 406, and subsequently an authentication protocol 408 (which are conceptually demarcated by lines 410 and 412 in FIG. 4). In the digital perimeter 404 (which may be a digital appliance that provides an additional layer of security beyond, e.g., an enterprise firewall), a first decision engine 414 may apply a first ruleset 416 (with various rules and security policies) to a login request. If the login request is received via Internet browser 403, the ruleset may additionally or alternatively apply certain browser-specific policies to the login request. The first decision engine, based on application of the first ruleset 416 to the login request (which may include user credentials and data related to the login attempt, as discussed above), may block 418 the login attempt if security protocols are not satisfied. If a login attempt is blocked, a standardized message may be returned to the native application 402 or Internet browser 403, to limit awareness of an attacker as to why the login request was denied (so as to reduce the likelihood the attacker may learn about what went wrong and retry login attempts with modified behavior intended to increase the odds of successful login). An example message is "we do not recognize your username and/or password. Please try again or visit the help page."

If security protocols of the digital perimeter 404 are satisfied, the login attempt may be allowed to proceed to a login application 420, which spans pre-authentication 406 and authentication 408. As part of pre-authentication 406, a second decision engine 422 and a third decision engine 424 may be employed to further evaluate the login attempt (such as the risk that the login attempt was initiated by a bot). The second and third decision engines 422, 424 apply second and third rulesets, respectively (not shown in FIG. 4). The first, second, and third decision engines 414, 422, 424 may output first, second, and third determinations 426, 428, 430, respectively (based on application of rulesets to available login data). It is noted that the decision engines 414, 422, 424 can be internal products, or they can be tools/strategies/products/services provided by outside vendors.

The first, second, and third determinations 426, 428, 430 may be fed to a central orchestrator 450, which may apply its own ruleset (further discussed below) to reach a "principal" determination regarding the login request. In certain embodiments, the principal determination may be to allow (pass/promote) 452, block (fail) 454, or challenge 456 a login request. A login request that is "allowed" may pass to authentication 408, which may include a process of verifying user identity 460 (such as validating a user's password), and if verified, the system may authorize access or otherwise allow the login process to continue 462. If a challenge 456 is to be issued, the system may provide a challenge question 458 to the user via native application 402 or Internet browser 403. The challenge question 458 may be, for example, a CAPTCHA challenge or any other inquiry requiring a response before login may proceed. The response (not shown) to challenge question 458 may, in various configurations, be provided to first, second, and/or third decision engines 414, 422, 424 for evaluation. It is noted that multiple challenge questions 458 can be issued, and the challenge question 458 need not be the first challenge presented to the user or the only one issued by the central orchestrator 450. For example, one of the decision engines (such as the first decision engine 414 in digital perimeter 404) may be allowed to issue a challenge question when login is first requested, and the first determination 426 may be based in part on the response (or lack thereof) to that challenge question. The central orchestrator 450 (and/or one or more other decision engines) may subsequently require follow-up challenge questions to authorize the login request.

It is also noted that the rulesets, such as the second and third rulesets, may be different from each other. Advantageously, having different rulesets allows the system to evaluate security risks using different criteria (by, for example, giving greater weight to certain characteristics and or indicators of legitimacy, or less weight to other characteristics or indicators). Certain criteria/rulesets may be better suited to detecting certain fraudulent activity than other criteria/rulesets, as each set of criteria/ruleset may have its strengths and its weaknesses. As different criteria may yield different error rates, taking multiple, different risk evaluations into account can reduce overall error rates (i.e., enhance accuracy by decreasing false positives and/or false negatives). In various configurations, one, a subset, or all of the decision engines make determinations independently (i.e., without input from another decision engine). In other configurations, one or more decision engines make determinations based at least in part on input (such as a determination) from one or more other decision engines. It is noted that in certain configurations, the rulesets may be the same, but the data fed to the decision engines may differ, allowing for potentially different (diversified) results that are consolidated by the central orchestrator 450 in reaching the principal result.

Two or all three of the determinations 426, 428, 430 may be fed to the central orchestrator 450. The first determination 426 of the first decision engine 414, in a non-block mode, may determine that a login request should be allowed to "pass" but is deemed "suspect" or "high-risk." That is, a login request may be not so risky that it should outright be blocked, but it may have certain characteristics that in certain situations are consistent with illegitimate login attempts or that otherwise make it somewhat less likely to be legitimate. The second decision engine 422 may issue a second determination 428 that indicates the login request is deemed to pass or fail security protocols. Similarly, the third decision engine 424 may issue a third determination 430 that indicates the login request is deemed to pass, fail, or warrant one or more challenge questions (which may be the first challenge question(s) issued to the user, or may be subsequent, follow-up challenge question(s)). The third determination 430 (as with the other determinations 426, 428) may also include various advisories regarding risky characteristics or behaviors, and/or may also include other data, such as device identification codes. As further discussed below, the central orchestrator 450 receives two or more of the determinations 426, 428, 430 and applies its rulesets to make a more informed determination.

Figure 4:
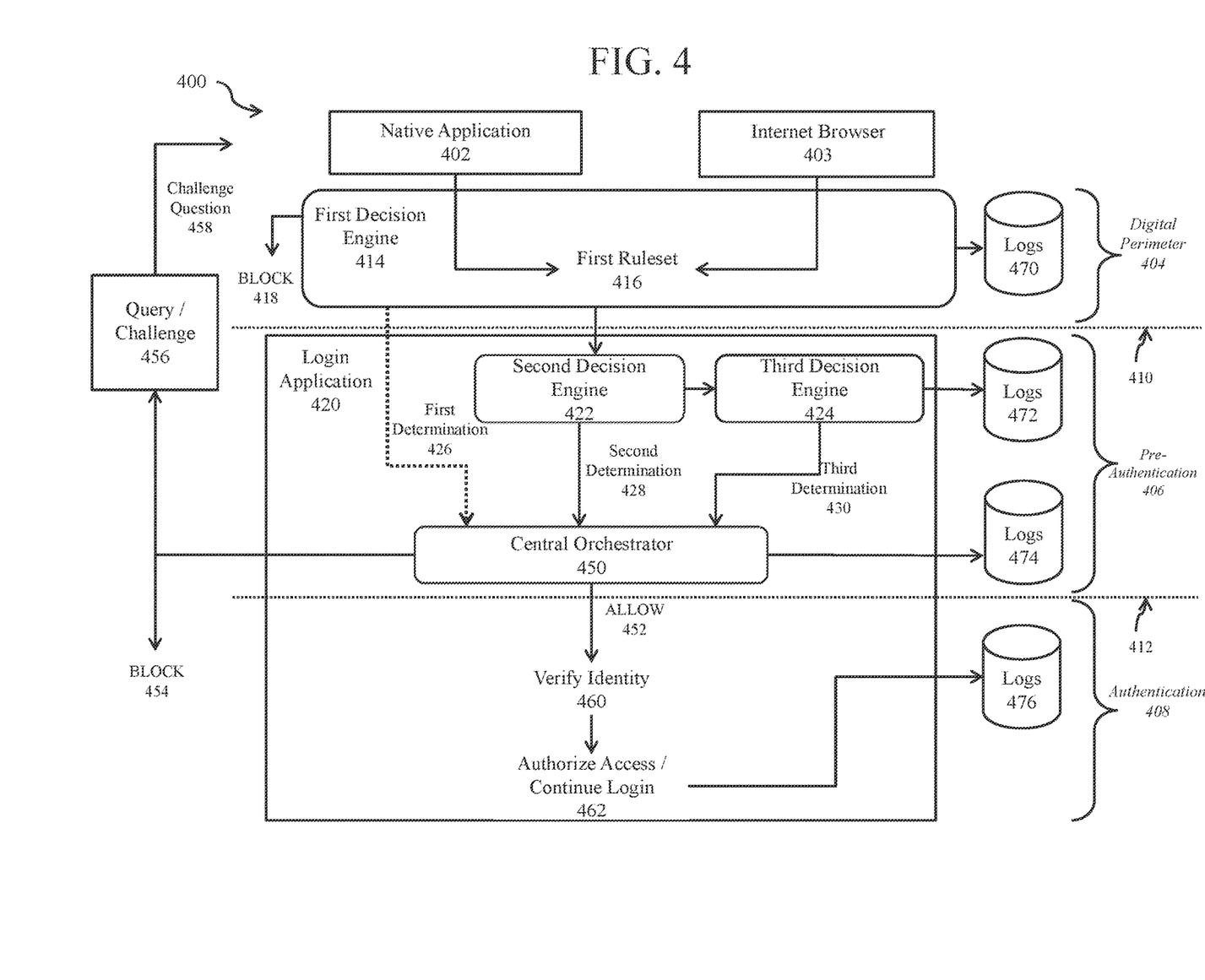
FIG. 4 provides an example account validation architecture according to one or more embodiments.

Although not explicitly shown in FIG. 4, it is noted that in addition to being provided to the central orchestrator 450, the second determination 428 may also, in certain configurations, be provided to third decision engine 424, which may apply the third ruleset to the login request and/or to the second determination 428. Similarly, the first determination 426 may be provided to the second decision engine 422 and/or the second decision engine 424 in various implementations. It is also noted that different combinations of decision engines may be applied depending on the source or nature of the login request. For example, a login request received via native application 402 may have first and third decision engines 416, 424 or second and third decision engines 416, 422 applied thereto, while a login request received via Internet browser 403 may have first and second decision engines 416, 422 or first and third decision engines 414, 424 applied thereto.

Additionally, although three decision engines are shown, with one engine being associated with the digital perimeter 404 and two others being associated with pre-authentication 406, any number (of two or more) decision engines in any combination or arrangement may be utilized. For example, more than one decision engine may be incorporated in the digital perimeter 404, one or three or more decision engines in pre-authentication 406. Further, not all decision engines in a system need to provide a result to central orchestrator 450 in all situations. For example, one or more of the decision engines may be skipped if the determinations of multiple other decision engines are positive, negative, or requiring a subsequent challenge.

It is noted that the activities of the system may be logged by the system, or sent to outside vendors to help the vendors to improve their product. For example, the first decision engine 414 may log its activities in internal logs 470. The third decision engine 424 may similarly log its activities in logs 472, which may be an external server of a vendor that provided the third decision engine 424. The central orchestrator 450 may record its activities in logs 474, and activities surrounding authorization of access and login may be recorded in logs 476. In different configurations, the logs 470, 472, 474, 476 may be maintained separately or together in any arrangement deemed suitable.

Figure 5:
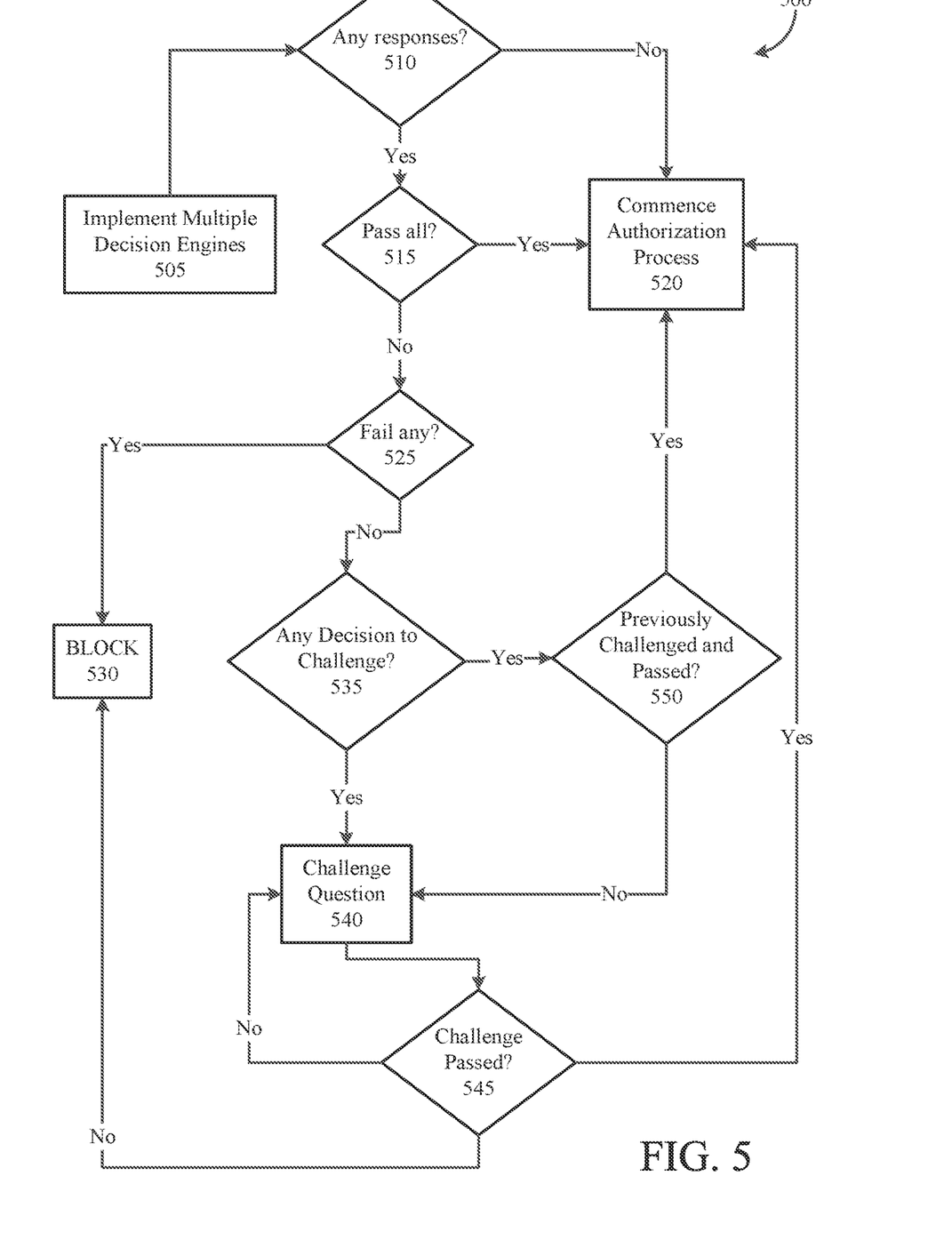
FIG. 5 provides an example set of rules that may be applied by a central orchestrator according to one or more embodiments.

Referring to FIG. 5, flowchart 500 provides one example of a potential set of rules that may, in one or more embodiments, be applied by a central orchestrator (or one or more decision engines). At 505, multiple decision engines are implemented to obtain multiple determinations. At 510, if none of the decision engines provides a response, the rules may, at 520, commence an authorization process. If one or more responses have been received from one or more decision engines, it may be determined, at 515, whether all of the determinations "pass" (i.e., promote) the login request. If so, the authorization process may be commenced at 520. If not all of the decision engines determine that the login request should promote the login request, it can be determined whether any of the decision engines fail the login request at 525. If yes, the system may block login attempt at 530. If no, then at 535 it is determined whether any of the decision engines determine that the login request should be challenged. If yes, at 540 a challenge question may be posed.

At 545, if the challenge question results in a "correct" or otherwise acceptable response, the system may proceed to the authorization process at 520. If the challenge question is incorrect or otherwise unacceptable, either another challenge question may be issued at 540, or the login attempt blocked at 530. In various configurations, if at 535 any of the decision engines determine that a challenge should be issued, the system may determine whether a challenge was previously imposed and passed at 550. If yes, the system may proceed to the authorization process at 520. If no, the system may issue a challenge question at 540. If the challenge question of 540 is passed, then the system may either block the login attempt 530, or issue another challenge question at 540. If the challenge question is passed, the system may proceed to the authorization process at 520. In alternative configurations, although not shown explicitly, multiple challenge questions may be issued, such that the system proceeds from 545 back to 540 rather than to 520 unless and until two or more challenge questions have passed. It is noted that this is but one possible set of rules, and other criteria and policies may be applied by the central orchestrator. For example, it may first be determined whether the IP address of a computing device being used to request login is on a list (such as a "whitelist"), in which case the login process may be allowed to proceed to authorization.

The above-described systems and methods provide for enhanced login and authentication systems that enhance security measures. For example, the risk assessments of multiple different decision engines may be consolidated to better evaluate whether a login request is submitted by a human user or a bot, better than can be accomplished with the risk assessment of a single decision engine. The disclosed login and fraud prevention approaches help reduce fraud and data breaches resulting from false negatives. The disclosed approaches also improve reliability of a system by reducing the number of legitimate login attempts that are rejected as a result of false positives.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method for authenticating requests to access a networked portal using authenticity evaluations by two or more automated decision engines, the method comprising:

receiving, from a remote computing device, a login request for access to the networked portal via the remote computing device;

submitting the login request to a first automated decision engine configured to apply a first ruleset for authenticating the login request and output a first security determination regarding the login request based on application of the first ruleset;

submitting at least one of the login request or the first security determination to a second automated decision engine configured to apply a second ruleset for authenticating the login request and output a second security determination regarding the login request based on application of the second ruleset, wherein the second ruleset differs from the first ruleset such that the second automated decision engine differs from the first automated decision engine; and based on the first and second security determinations from the first and second automated decision engines, respectively, performing at least one of the following acts:

i) allowing the login request to proceed to validation of user identity for access to the networked portal;

ii) blocking the login request from proceeding to validation of user identity; or iii) returning a challenge query to the networked portal.

2. The method of claim 1, wherein the first and second automated decision engines, in authenticating the login request, are adapted to evaluate whether the login request was submitted by a human user or a software robot.

3. The method of claim 2, wherein if the login request is blocked from proceeding to validation of user identity, the method further includes returning, to the networked portal, an error message that does not indicate a result of the evaluation corresponding to whether the login request was submitted by a human user or a software robot.

4. The method of claim 1, wherein validation of user identity includes validating at least one of a username or a password corresponding to a user account accessible via the networked portal.

5. The method of claim 1, wherein returning the challenge query to the networked portal comprises:

providing a challenge question to the networked portal;

receiving, via the networked portal, a response to the challenge question; and providing the response to at least one of the first automated decision engine or the second automated decision engine.

6. The method of claim 5, wherein the challenge question is a second challenge question submitted via the networked portal and the response is a second response received via the networked portal, and wherein at least one of the first automated decision engine or the second automated decision engine is configured to submit a first challenge question via the networked portal and receive a first response used in making at least one of the first security determination or the second security determination.

7. The method of claim 1, wherein, by using the first and second security determinations from the first and second automated decision engines, respectively, the method reduces at least one of false positives or false negatives in evaluating whether login requests are submitted by human users or software robots.

8. The method of claim 1, wherein the step of allowing, blocking, or returning a challenge query based on the first and second security determinations includes submitting both the first and second security determinations to an automated central orchestration engine configured to apply a third ruleset to the first security determination and the second security determination for authenticating the login request, wherein the third ruleset differs from the first and second rulesets.

9. The method of claim 8, wherein the automated central orchestration engine does not apply the third ruleset to the login request in authenticating the login request.

10. The method of claim 1, wherein the step of allowing, blocking, or returning a challenge query according to (i), (ii), or (iii), respectively, is based only on the first and second security determinations from the first and second automated decision engines, respectively.

11. The method of claim 1, wherein the networked portal is presented to the remote computing device via a software application executing on the remote computing device, and wherein the login request includes data corresponding to the remote computing device executing the software application.

12. The method of claim 1, wherein the login request is provided by a submitter, and wherein the login request includes data corresponding to behavior of the submitter of the login request.

13. A system for authenticating requests to access a networked portal using authenticity evaluations by two or more automated decision engines, the system comprising a processor and a memory having instructions that, when executed by the processor, are configured to direct the system to:
receive, from a remote computing device, a login request for access to the networked portal via the remote computing device;
submit the login request to a first automated decision engine configured to apply a first ruleset for authenticating the login request and output a first security determination regarding the login request based on application of the first ruleset;
submit at least one of the login request or the first security determination to a second automated decision engine configured to apply a second ruleset for authenticating the login request and output a second security determination regarding the login request based on application of the second ruleset, wherein the second ruleset differs from the first ruleset such that the second automated decision engine differs from the first automated decision engine;
based on the first and second security determinations from the first and second automated decision engines, respectively, perform at least one of the following acts:
i) allow the login request to proceed to validation of user identity for access to the networked portal;
ii) block the login request from proceeding to validation of user identity; or
iii) return a challenge query to the networked portal.

14. The system of claim 13, wherein the first and second automated decision engines, in authenticating the login request, are adapted to evaluate whether the login request was submitted by a human user or a software robot.

15. The system of claim 13, wherein the networked portal is presented to the remote computing device via a device application executing on the remote computing device, and wherein the system is configured such that returning the challenge query to the networked portal comprises:
transmitting a challenge question to the device application;
receiving, via the device application, a response to the challenge question; and
providing the response to at least one of the first automated decision engine or the second automated decision engine.

16. The system of claim 13, wherein validation of user identity includes validating at least one of a username or a password corresponding to a user account accessible via the networked portal.

17. The system of claim 13, wherein the networked portal is presented to the remote computing device via a web browser or a mobile device application executing on the remote computing device, and wherein the login request includes at least one of:
data identifying an owner of a user account to be accessed via the networked portal;
data related to the remote computing device executing the web browser or the mobile device application; or
data related to behavior of a submitter of the login request.

18. A computer-implemented method for authenticating requests to access a networked portal using authenticity evaluations by two or more automated decision engines, the method comprising:
receiving, from a remote computing device, a login request for access to the networked portal via the remote computing device;
using a first automated decision engine to obtain a first security determination corresponding to the login request;
using a second automated decision engine to obtain a second security determination corresponding to the login request, wherein the second automated decision engine differs from the first automated decision engine;
based on the first and second security determinations from the first and second automated decision engines, respectively, performing at least one of the following acts:
i) allowing the login request to proceed to validation of user identity;
ii) blocking the login request from proceeding to validation of user identity; or
iii) returning a challenge question to the networked portal, and providing a response to the challenge question to at least one of the first automated decision engine or the second automated decision engine;
wherein the first and second automated decision engines are adapted to evaluate whether the login request is submitted by a human user or a software robot.

19. The method of claim 18, wherein:
using the first automated decision engine to obtain the first security determination includes applying a first ruleset to a first dataset, and using the second automated decision engine to obtain the second security determination includes applying a second ruleset to a second dataset; and the first ruleset differs from the second ruleset.

20. The method of claim 19, wherein the networked portal is presented to the remote computing device via a web browser or a mobile device application, and wherein at least one of the first dataset or the second dataset includes data corresponding to the remote computing device executing the web browser or the mobile device application.

* * * * *